United States Patent
Osborne et al.

(10) Patent No.: US 9,839,959 B2
(45) Date of Patent: Dec. 12, 2017

(54) CENTER CIRCULAR GATING DESIGN FOR SQUEEZE CASTING INDUCTION ROTOR CORE

(71) Applicant: GM Global Technology Operations LLC, Detroit, MI (US)

(72) Inventors: Richard J. Osborne, Shelby Township, MI (US); Qigui Wang, Rochester Hills, MI (US); Frank Sant, White Lake, MI (US)

(73) Assignee: GM Global Technology Operations LLC, Detroit, MI (US)

(*) Notice: Subject to any disclaimer, the term of this patent is extended or adjusted under 35 U.S.C. 154(b) by 128 days.

(21) Appl. No.: 14/573,508

(22) Filed: Dec. 17, 2014

(65) Prior Publication Data

US 2016/0175922 A1 Jun. 23, 2016

(51) Int. Cl.
*B22C 9/08* (2006.01)
*B22C 9/06* (2006.01)
*H02K 15/00* (2006.01)
*B22D 17/00* (2006.01)
*B22D 17/22* (2006.01)

(52) U.S. Cl.
CPC ............... *B22C 9/08* (2013.01); *B22C 9/06* (2013.01); *B22C 9/067* (2013.01); *B22C 9/082* (2013.01); *B22D 17/00* (2013.01); *B22D 17/2272* (2013.01); *H02K 15/0012* (2013.01)

(58) Field of Classification Search
CPC .. B22C 9/06; B22C 9/067; B22C 9/08; B22C 9/082; B22D 17/00; B22D 17/2272; B22D 17/24; B22D 19/0054; H02K 15/0012

USPC ......... 164/109, 112, 113, 303–318, 333, 334
See application file for complete search history.

(56) References Cited

U.S. PATENT DOCUMENTS

| | | | | |
|---|---|---|---|---|
| 3,783,317 A * | 1/1974 | Sisk | ............... | B22D 19/0054 310/212 |
| 5,355,933 A | 10/1994 | Voss | | |
| 5,538,067 A * | 7/1996 | Nakamura | ......... | H02K 15/0012 164/112 |
| 5,887,643 A * | 3/1999 | Nakamura | ......... | H02K 15/0012 164/312 |

(Continued)

FOREIGN PATENT DOCUMENTS

| | | |
|---|---|---|
| CN | 2759644 Y | 2/2006 |
| DE | 102012218723 A1 | 4/2013 |

(Continued)

OTHER PUBLICATIONS

Gating Element Design, http://www.themetalcasting.com/gating-element-design.html, Dec. 4, 2012.*

(Continued)

*Primary Examiner* — Kevin E Yoon
(74) *Attorney, Agent, or Firm* — BrooksGroup

(57) ABSTRACT

A number of variations may include at least one mold portion that may define a first cavity, a circular gating system, and at least one sprue. The circular gating system may surround the first cavity and define a continuous in-gate from the circular gating to the first cavity. The at least one sprue and at least one vent may be in fluid communication with the circular gating system and the first cavity.

7 Claims, 1 Drawing Sheet

(56) References Cited

U.S. PATENT DOCUMENTS

| | | | | |
|---|---|---|---|---|
| 5,887,646 A * | 3/1999 | Evans | ............... | B22D 1/007 |
| | | | | 164/349 |
| 6,786,272 B2 * | 9/2004 | Cowie | ............ | B22D 19/0054 |
| | | | | 164/103 |
| 7,337,526 B2 * | 3/2008 | Sweo | ............ | B22C 9/04 |
| | | | | 164/112 |
| 2005/0067130 A1 * | 3/2005 | Ramirez | ........... | B22D 13/04 |
| | | | | 164/103 |
| 2013/0093282 A1 * | 4/2013 | Wang | ........... | H02K 15/0012 |
| | | | | 310/211 |

FOREIGN PATENT DOCUMENTS

| | | |
|---|---|---|
| DE | 102013000746 A1 | 7/2014 |
| JP | 2013013914 A | 1/2013 |

OTHER PUBLICATIONS

Chinese Office Action dated May 9, 2017 ; Application No. 201510947888.4; Applicant: GM Global Technology Operations LLC.; 6 pages.

* cited by examiner

CENTER CIRCULAR GATING DESIGN FOR SQUEEZE CASTING INDUCTION ROTOR CORE

TECHNICAL FIELD

The field to which the disclosure generally relates includes casting gating systems.

BACKGROUND

Casting molten metal into narrow cavities present challenges.

SUMMARY OF SELECT ILLUSTRATIVE VARIATIONS

A number of variations may include a product that may include at least one mold portion defining a first cavity, a circular gating system, and at least one sprue, the circular gating system surrounding the first cavity and defining a continuous in-gate from the circular gating system to the first cavity, and the at least one sprue and at least one vent being in fluid communication with the circular gating system and first cavity.

A number of variations may include a method that may include providing at least one mold portion defining a first cavity, a circular gating system, at least one sprue, and at least one vent, the circular gating system surrounding the first cavity and defining a continuous in-gate from the circular gating system to the first cavity, and the at least one sprue and at least one vent being in fluid communication with the circular gating system and the first cavity. The method may further include the step of squeeze casting a part by flowing a molten metal through the at least one sprue, through the circular gating system, and into the first cavity, and solidifying the molten metal to form the part.

A number of variations may include a method that may include the steps of providing at least one mold portion defining a first cavity, a circular gating system, at least one sprue, and at least one vent, the circular gating system surrounding the first cavity and defining a continuous in-gate from the circular gating system to the first cavity, and at least one sprue and at least one vent may be in fluid communication with the circular gating system and the first cavity. The first cavity may include a plurality of lamina cavities disposed between a first end ring cavity and a second end ring cavity in fluid communication with the circular gating system. The method may further include providing a second mold portion that may further define the first cavity, the circular gating system, the at least one sprue, and the at least one vent. The method may further include abutting the at least one mold portion against the second mold portion to form the first cavity, and squeeze casting a part by flowing the molten metal through the at least one sprue, through the circular gating system, and into the first part. The method may further include pressurizing the molten metal to a pressure ranging from about 10,000 to about 14,000 PSI, solidifying the molten metal to form the part having a porosity of about 0.02%, and separating the part from the circular gating system.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figures 1A, 1B:
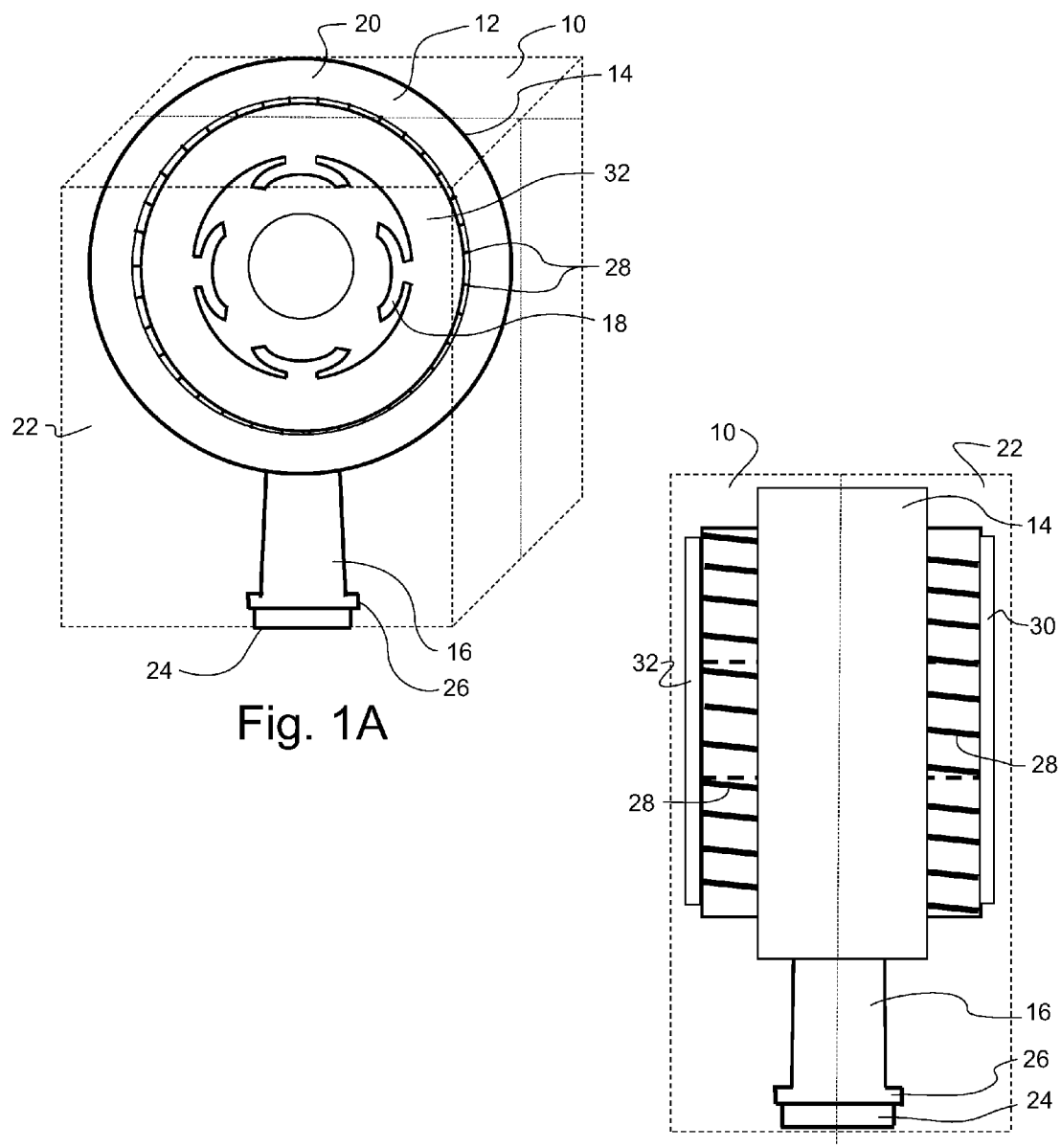
FIG. 1A illustrates a method of casting a part using a two-part mold according to a number of variations.
FIG. 1B illustrates a method of casting a part using a two-part mold according to a number of variations.

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

Referring to FIGS. 1A and 1B, at least one mold portion 10 may define a first cavity 12, a circular gating system 14, at least one sprue 16, at least one vent or overflow 18. The circular gating system 14 may define a continuous in-gate 20 that may be in fluid communication with the first cavity 12. The first cavity 12 may include a plurality of lamina cavities 28 (conducting bar slots), a first end ring cavity 30, and a second end ring cavity 32. The continuous in-gate 20 may be in fluid communication with the plurality of lamina cavities 28. The at least one mold portion 10 may further include a second mold portion 22, and may define at least one biscuit 24 and a choke 26.

The at least one mold portion 10 may include the second mold portion 22, and together the at least one mold portion 10 and second mold portion 22 may define the first cavity 12. The first cavity 12 may include a circular gating system 14, at least one sprue 16, at least one vent or at least one overflow 18, a continuous in-gate 20, at least one biscuit 24, and a choke 26. The first cavity 12 may further include a plurality of lamina cavities 28, first end ring cavity 30, and a second end ring cavity 32 that may together define the dimensions of a product to be cast.

The circular gating system 14 may include a continuous in-gate 20 in fluid communication with the plurality of lamina cavities 28, such that, when a part is cast, molten metal may be flowed through the at least one sprue 16, through the choke 26, into the circular gating system 14 and the continuous in-gate 20 and furthermore into the plurality of lamina cavities 28, into the end rings 28 and 30, and into the vent and overflows 18. In this way, molten metal may be flowed directly into the plurality of lamina cavities 28 such that the porosity of the final product may be reduced, voids within the cast product may be minimized, and shrinkage of the part may be reduced. The final product may have reduced air entrapment voids within the cast product, and metal shrinkage in cast part may be reduced. The final product may have reduced air entrapment voids within the cast product, and metal shrinkage in cast part may be reduced.

In a number of variations, high integrity castings may be produced via a squeeze casting process with minimal voids and less than 0.02% porosity. Molten metal may be flowed through a sprue, a circular gating system including a contiguous in-gate, and into the first cavity at a speed of about 0.2 to 5.0 m/s and under a pressure ranging from about 10,000 to about 14,000 PSI. In some instances, the molten metal may be an aluminum alloy, steel, or a copper alloy. In a number of variations the method may be conducted or carried out so that the solidified metal part has a porosity ranging from about 0.5% to less than 0.02%.

Parts having a plurality of lamina may be produced by flowing molten metal directly to the plurality of lamina. The parts may include, but are not limited to, rotors, turbines, or parts that may include thin fins, lamina, scales, or layers. The molten metal may be any metal or metal alloy, but may be copper or aluminum alloy.

According to variation 1, a product may include at least one mold portion defining a first cavity, a circular gating system, and at least one sprue, the circular gating system may surround the first cavity and may define a continuous in-gate from the circular gating system to the first cavity, and the at least one sprue and the at least one vent or overflow may be in fluid communication with the circular gating system and the first cavity.

Variation 2 may include a product as set forth in variation 1, wherein the first cavity may include a squirrel cage rotor cavity.

Variation 3 may include a product as set forth in variation 1 or 2, wherein the at least one mold portion may include a second mold portion that may further define the first cavity, the circular gating system, the at least one sprue, and the at least one vent.

Variation 4 may include a product as set forth in any of variations 1 through 3, wherein the at least one mold portion may further define at least one biscuit.

Variation 5 may include a product as set forth in any of variations 1 through 4, wherein the at least one mold portion may further define a choke in fluid communication with the sprue and the circular gating system.

Variation 6 may include a product as set forth in any of variations 1 through 5, wherein the first cavity may include a plurality of lamina cavities that may be disposed between a first end ring cavity and a second end ring cavity, all of which may be in fluid communication with the circular gating system.

Variation 7 may include a product as set forth in any of variations 1 through 6, wherein the at least one mold portion may further define at least one vent or overflow having a generally kidney shape.

According to Variation 8, a method may include providing at least one mold portion that may define a first cavity, a circular gating system, at least one sprue and at least one vent. The circular gating system may surround the first cavity and define a continuous in-gate from the circular gating system to the first cavity, and the at least one sprue and the at least one vent may be in fluid communication with the circular gating system and the first cavity. The method may further include squeeze casting a part by flowing a molten metal through the at least one sprue, through the circular gating system, and into the first part, and solidifying the molten metal to form the part.

Variation 9 may include a method as set forth in variation 8, and may further include the step of pressurizing the molten metal to a pressure ranging from about 10,000 to about 14,000 PSI prior to solidifying the metal.

Variation 10 may a include a method as set forth in any of variations 8 through 9, and may further include providing a second mold portion that may further define the first cavity, the circular gating system, the at least one sprue, and the at least one vent or overflow prior to squeeze casting a part by flowing the molten metal through the at least one sprue, through the circular gating system, and into the first part.

Variation 11 may include a method as set forth in any of variations 8 through 10, wherein the part may have a porosity ranging from about 0.5% to about 0.02%.

Variation 12 may include a method as set forth in any of variations 8 through 11, wherein the first cavity may include a plurality of lamina cavities disposed between a first end ring cavity and a second end ring cavity and fluid communication with the circular gating system and the circular gating system may be constructed and arranged to allow molten metal to flow from the at least one sprue, through the circular gating system and into the plurality of lamina cavities, the first end ring cavity, the second end ring cavity, and the at least one vent or overflow.

Variation 13 may include a method as set forth in any of variations 8 through 12, and may further include separating the part from the solidified metal and the circular gating system, the at least one sprue, and the at least one vent or overflow.

Variation 14 may include a method as set forth in any of variations 8 through 13, wherein the part is a rotor having a plurality of lamina.

Variation 15 may include a method as set forth in variation 14, wherein the rotor may be a squirrel cage rotor.

Variation 16 may be a method as set forth in any of variations 8 through 15 wherein the molten metal may be an aluminum alloy.

Variation 17 may include a method as set forth in any of variations 8 through 16, wherein the molten metal may be a low carbon, high silicon steel.

Variation 18 may include a method as set forth in any of variations 8 through 17, wherein the molten metal may be an iron alloy.

Variation 19 may be a method as set forth in any of variations 8 through 18, wherein the molten metal may be a copper alloy.

According to Variation 20, a method may include providing at least one mold portion defining a first cavity, a circular gating system, at least one sprue, and at least one vent. The circular gating system may surround the first cavity and define a continuous in-gate from the circular gating system to the first cavity, and the at least one sprue and the at least one vent being in fluid communication with the circular gating system and the first cavity, and the first cavity including a plurality of lamina cavities disposed between a first end ring cavity and a second end ring cavity and fluid communication with the circular gating system, providing a second mold portion that may further define the first cavity, the circular gating system, the at least one sprue and the at least one vent or overflow, abutting the at least one mold portion against the second mold portion to form the first cavity, squeeze casting a part by flowing a molten metal through the at least one sprue, through the circular gating system, and into the first part, pressurizing the molten metal to a pressure ranging from about 10,000 to about 14,000 PSI, solidifying the molten metal to form the part having a porosity ranging from about 0.5% to about 0.02%, and separating the part from the circular gating system.

The above description of variations of the invention is merely demonstrative in nature and, thus, variations thereof are not to be regarded as a departure from the spirit and scope of the inventions disclosed within this document.

What is claimed is:

1. A product comprising:
    at least one mold portion defining a first cavity, the first cavity being generally tubular in shape and having an outer circumference opposite an inner circumference, a circular gating system, and at least one sprue, the circular gating system surrounding the outer circumference of the first cavity and defining a continuous in-gate from the circular gating system to the first cavity, and the at least one sprue and at least one vent being in fluid communication with the circular gating system and wherein the at least one vent is disposed on the inner circumference of the first cavity.

2. A product as set forth in claim 1, wherein the first cavity defines a squirrel cage rotor cavity.

3. A product as set forth in claim 1, wherein the at least one mold portion includes a second mold portion that may further define the first cavity, the circular gating system, the at least one sprue, and the at least one vent.

4. A product as set forth in claim 1, wherein the at least one mold portion further defines at least one biscuit.

5. A product as set forth in claim 1, wherein the at least one mold portion further defines a choke in fluid communication with the sprue.

6. A product as set forth in claim 1, wherein the first cavity includes a plurality of lamina cavities disposed between a first end ring cavity and a second end ring cavity in fluid communication with the circular gating system.

7. A product as set forth in claim 1, wherein the at least one mold portion further defines at least one vent or overflow having a generally kidney shape.

* * * * *